Jan. 15, 1952     W. F. KLEIN     2,582,546
AUTOMATIC CHARGING AND VENT VALVE
Filed June 29, 1950
Fig.1
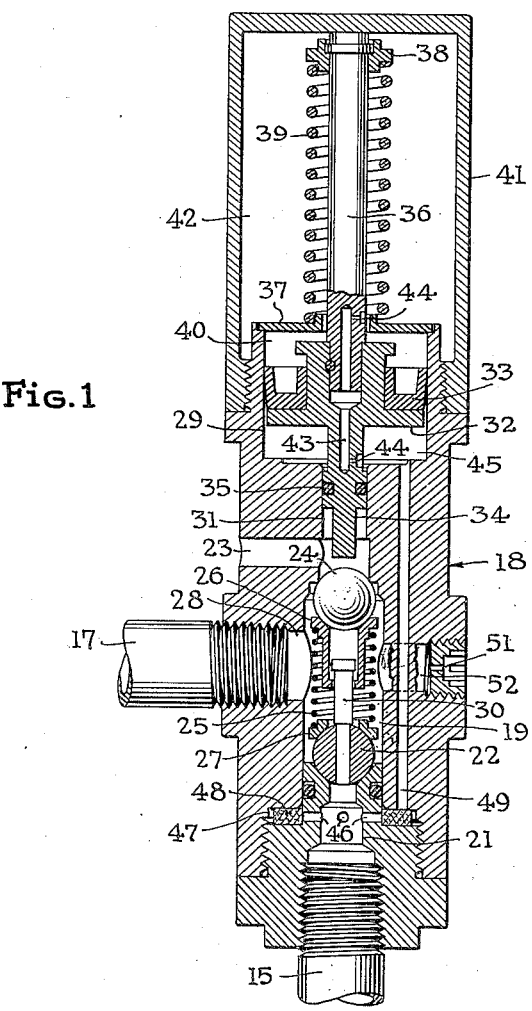
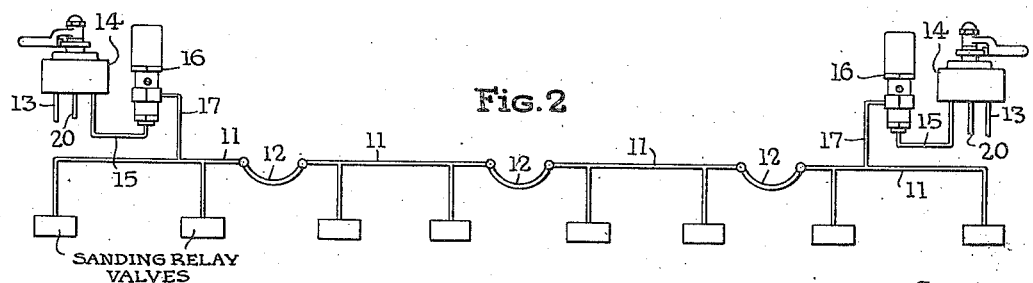
Fig.2
Inventor
William Frederick Klein
By
Attorneys Patented Jan. 15, 1952

2,582,546

UNITED STATES PATENT OFFICE 2,582,546

AUTOMATIC CHARGING AND VENT VALVE

William F. Klein, Watertown, N. Y., assignor to The New York Air Brake Company, a corporation of New Jersey Application June 29, 1950, Serial No. 171,090

6 Claims. (Cl. 291—15)

1

This invention relates to an automatic charging and release valve. Specifically it concerns an automatic valve whereby a control pipe in a pneumatic system may be put under pressure or vented to atmosphere by any one of a plurality of such valves associated with the control pipe.

The invention is intended for use in conjunction with the pneumatic systems employed by train locomotives. Other uses of the invention will suggest themselves to those skilled in the art, and no limitation to the particular usage is intended.

Modern railroading practice has brought about increased use of multi-unit locomotives. Each individual propulsion unit is equipped with numerous pneumatically operated accessory devices, which are controlled by the air pressure in what is termed a "control pipe." It is desirable that this control pipe, which extends through all of the units, should be charged with pressure fluid or vented to atmosphere from any one of the individual units without the necessity of operating cut-out or change-over valves. Attempts to solve this problem in the past have required that additional piping between units be furnished. This additional piping is undesirable. The present invention solves this problem in a manner that permits the engineer to charge and discharge the control pipe from any one of the units without having to operate any change-over or cut-out valves, and makes it unnecessary to introduce any new connections between units.

The invention relates to an automatic valve whereby a control pipe may be charged with pressure fluid or vented to atmosphere. The automatic valve has therein a valve chamber which is in constant communication with the control pipe. This valve chamber is provided with inlet and exhaust connections. The inlet connection leads to a pilot line to which pressure fluid may be supplied and from which the pressure fluid may be exhausted. This pilot line is controlled by any suitable means such as a manually operated valve. The inlet and exhaust connections are provided with valves which isolate the valve chamber and control pipe from the pilot line and from the exhaust connection, except when the valves are open. The inlet valve is a check valve which provides one way flow from the pilot line to the valve chamber and control pipe, when pressure fluid is admitted to the former.

The exhaust valve is maintained closed during the charging of the control pipe, but is adapted to be unseated by a motor piston when the pressure is released from the charging line. The exhaust valve remains open until the control pipe is vented, and it then automatically returns to its seat, thus isolating the valve chamber and control pipe from the inlet and exhaust connections. Since the valve chamber and the control pipe are isolated from the inlet and exhaust connections, it will be seen that the control pipe may be charged through any one of a plurality of these automatic valves.

A preferred embodiment of the invention is shown in the accompanying drawing in which:

Fig. 1 is an axial section of a relay valve embodying the invention.

Fig. 2 is a schematic showing of a typical pneumatic circuit embodying the invention.

Refer first to Fig. 2. The reference numeral 11 indicates the sections of a control pipe. These sections are each located on one of the locomotive units making up the propulsion unit. The sections are connected together at their adjacent ends by the couplings 12. The sections on the end units are closed at their outer ends. A plurality of pneumatic devices, for example, sanding relay valves indicated by legend, are adapted to be supplied with air from the control pipe when it is charged. Pipes 13 lead from a suitable pressure source, such as the main air reservoir, not shown, to the manually operated valves 14. The valves 14 may be operated to admit air to pilot line 15 leading to the automatic valve 16 and line 17. The valves 14 may also be moved to a position in which the pilot line 15 is vented through the connection 20 and this last is the running position of the valves 14.

As shown in Fig. 1 the automatic valve 16 comprises a body 18. Formed centrally of the body is an elongated valve chamber 19. Pilot line 15 is connected to the inlet connection 21 which is controlled by the ball check valve 22 and leads to one end of the valve chamber 19. An exhaust port 23 leads from the other end of the valve chamber 19 and is controlled by a second ball check valve 24. The check valves 22 and 24 are biased against their seats by a spring 25. The spring is carried between the shoulder on the thrust member 26 which engages the valve 24 and collar 27 carried by the valve 22. The member 30 serves as a valve guide.

It will be understood that the arrangement of these valves is as shown because space considerations on a locomotive require that the relay valve be made as small as possible. Any type of inlet check valve could be substituted for this preferred form. The control pipe connection 28 leads from the valve chamber intermediate of the connection 21 and the port 23. The pipe 17 is secured in this connection 28. The pipe 17 is in constant communication with the valve chamber 19.

The body 18 is provided with cylindrical bores 29 and 31 which are alined with the valve chamber 19. A motor piston 32 is reciprocable in the bore 29 and is provided with a flexible packing cup 33. An actuating element 34 is reciprocable in the bore 31 and is provided with a sealing ring 35 to prevent leakage. The element 34 is shown integral with the piston 32. It will be understood that any rigid connection between these two parts would suffice.

An axial rod 36 extends from the other face of the piston 32 through an opening in the plate 37. A collar 38 is secured to the outer end of the rod 36 and acts as a seat for the spring 39 which reacts between the collar 38 and the plate 37 to bias the motor piston to its inactive position. A cover 41 is secured to the body 18 and serves to define a volume 42. The port 43 and restrictions 44 afford restricted communication between the working space 40 and the working space 45.

Radial ports 46 lead from the inlet connection 21 to the annular chamber 47 in which is disposed a filter 48. A port 49 leads from the chamber 47 to working space 45. A choke 51 is placed in the passage 52 leading from the valve chamber 19 to atmosphere. The porting of the device as it is shown in the drawings is schematic. Actually the ports do not lie on a single plane as shown. The particular arrangement of the ports is a matter of design.

The operation of the device is as follows:

If the operating valve 14 on one of the locomotive units is manipulated so that pressure fluid is admitted to line 15, the check valve 22 will be moved from its seat charging the valve chamber 19 and pipe 17. From pipe 17, the fluid flows to the control pipe 11, thus supplying fluid under pressure to operate the pneumatic devices. The escape of pressure fluid through the other release valve or valves 16 is prevented by the check valves 22 and 24 therein which remain seated.

Pressure fluid from the inlet connection 21 also flows through the radial ports 46 through the strainer 48 to passage 49, and hence to working space 45. Pressure fluid in the working space 45 flows freely around the packing cup 33 to the working space 40. Thus, it will be seen that the motor piston 32 is pneumatically balanced during the charging period.

When the pressure fluid in pilot line 15 is released by operation of the valve 14, the pressure fluid in the working space 45 is likewise released. Pressure fluid in the space 40 can escape only through the port 43 and restrictions 44, thus the pneumatic balance is destroyed. The bias of the spring 39 will be overcome and the piston 32 and actuating member 34 will be moved downwardly (as seen in the drawing) whereby the member 34 will unseat the check valve 24. The opening of this valve causes the control pipe and the attached pneumatic devices to be vented to atmosphere through the exhaust port 23. The size of the restrictions 44 is such that ample time is provided for the control pipe to be completely vented before the spring returns the piston 32 and member 34 to their normal positions, in which the member 34 is ineffective to unseat the motor operated exhaust valve 24.

In the event that the exhaust valve is not unseated through some operating failure, the choke 51 affords a restricted outlet so that control pipe 11 will be vented. This choke also affords an escape for minor leakage past the operating valve 14.

While the construction of the valve has been described in considerable detail, no limitation to this precise structure is implied, except as is stated in the appended claims. The form of the exhaust valve 24 illustrated is preferred because it is cheaper to manufacture and less cumbersome than other types of valves, but the same function could be realized by use of other types of motor operated valves.

I claim:

1. The combination of a control pipe and at least two controlling valve mechanisms, each of which is operable to charge and to vent said control pipe, and each of which has an inactive position in which it does not interfere with the charging and venting functions of the other, said valves each comprising in combination, a pilot connection; means operable selectively to charge and to vent said pilot connection; a check valve providing one way flow from the pilot connection to the control pipe; an exhaust valve controlling flow from the control pipe to atmosphere; means biasing said valves to closed position; a motor comprising a cylinder and a piston reciprocable in said cylinder and dividing the cylinder into first and second working spaces; a mechanical connection by which said piston opens said exhaust valve when the piston moves toward the first working space; means affording substantially unrestricted flow from said first working space to the second working space and restricted reverse flow therebetween; means affording free flow between the pilot connection and said first working space; and yielding means biasing said piston toward said second working space.

2. The combination of a control pipe; a plurality of pneumatically operated devices attached thereto; at least two pilot lines whereby pressure may be admitted to said control pipe at points remote to one another; means operable selectively to charge or vent said pilot lines independently; an automatic valve disposed between each of said pilot lines and said control pipe; said automatic valve comprising a body having therein a valve chamber, a motor cylinder and a bore between said cylinder and chamber; said chamber having an inlet from one of said pilot lines, an outlet to said control pipe, and an exhaust connection; an inlet valve in said chamber affording one way flow through said inlet connection from the pilot line to said chamber; an exhaust valve in said chamber normally inhibiting flow from said chamber through said exhaust connection; a piston in said cylinder and dividing said cylinder into first and second working spaces; means affording substantially unrestricted flow from said first working space to said second working space and restricted reverse flow therebetween; means affording free flow from said inlet connection to said first working space; a member attached to said piston and shiftable in said bore, said member serving to open said exhaust valve when said piston moves toward said first working space; and yielding means biasing said piston toward said second working space.

3. The combination defined in claim 2 said valve chamber having a constantly open restricted flow passage leading therefrom to atmosphere.

4. The combination defined in claim 2 in which the means affording substantially unrestricted flow from said first working space to said second working space and restricted reverse flow therebetween comprises a flexible packing cup encircling said piston, said cup being arranged to permit fluid to flow from said first working space past said cup to said second working space but to close against reverse flow, said member having formed therein a restricted passage connecting said working spaces.

5. The combination defined in claim 2 in which said valve chamber is elongated and said inlet and said outlet connections lead to opposite ends thereof, the said inlet and exhaust valves are of the ball type; and a spring disposed between said valves biasing them toward their respective seats.

6. The combination in claim 2 including an auxiliary volume in communication with said second working space whereby the effective volume of said second working space is increased and closing of the exhaust valve is delayed.

WILLIAM F. KLEIN.

No references cited.